United States Patent [19]

Wu et al.

[11] Patent Number: 4,707,538

[45] Date of Patent: Nov. 17, 1987

[54] POLYAMIDE PREPARATION WITH PENTAAMINE COBALT (III) COMPLEX CATALYST

[75] Inventors: Mu-Yen M. Wu, Cuyahoga Falls; Lawrence E. Ball, Akron; Gerald P. Coffey, Lyndhurst, all of Ohio

[73] Assignee: The Standard Oil Company, Cleveland, Ohio

[21] Appl. No.: 561,709

[22] Filed: Dec. 15, 1983

Related U.S. Application Data

[63] Continuation-in-part of Ser. No. 336,545, Jan. 4, 1982, abandoned.

[51] Int. Cl.$^4$ ............................................. C08G 69/08
[52] U.S. Cl. ..................................... 528/315; 526/90; 526/171; 526/172; 526/310; 526/311; 526/312; 528/310; 528/319; 528/336; 528/335; 528/363
[58] Field of Search ............... 526/312, 310, 311, 171, 526/172, 90; 528/315, 319, 363

[56] References Cited

U.S. PATENT DOCUMENTS

| | | | |
|---|---|---|---|
| 2,691,643 | 10/1954 | Chirtel et al. | 528/328 |
| 2,749,331 | 6/1956 | Breslow | 526/303.1 |
| 3,499,879 | 3/1970 | Kobayashi et al. | 526/91 |
| 3,629,203 | 12/1971 | Volker et al. | 528/310 |
| 3,994,866 | 11/1976 | Lund et al. | 525/427 |
| 4,283,524 | 8/1981 | Greene | 528/363 |

OTHER PUBLICATIONS

Korshak et al—Synthetic Hetero-Chain Polyamides, 1964, p. 9.

Primary Examiner—Harold D. Anderson
Attorney, Agent, or Firm—David P. Yusko; John F. Miller; Larry W. Evans

[57] ABSTRACT

A polyamide is produced by polymerizing at least one of an alpha, beta-unsaturated carboxylic acid and ammonia, an ammonium salt of an alpha, beta-unsaturated carboxylic acid, an alpha, beta-unsaturated nitrile and water, a beta-amino propionic acid or alkyl derivative thereof and an alpha, beta-unsaturated amide and ammonia in the presence of a catalyst comprising a pentaammine cobalt (III) complex.

8 Claims, No Drawings

POLYAMIDE PREPARATION WITH PENTAAMINE COBALT (III) COMPLEX CATALYST

REFERENCE TO RELATED APPLICATIONS

This application is a continuation-in-part of copending application Ser. No. 336,545 filed Jan. 4, 1982 now abandoned.

BACKGROUND OF THE INVENTION

This invention relates to new catalysts useful for the preparation of polyamides. More particularly, this invention relates to the polymerization of at least one of an alpha, beta-unsaturated carboxylic acid and ammonia, an ammonium salt of an alpha, beta unsaturated carboxylic acid, an alpha, beta-unsaturated nitrile and water, a beta-amino propionic acid or its alkyl derivatives and an alpha, beta-unsaturated amide and ammonia in the presence of a catalyst comprising a pentaammine cobalt (III) complex.

It is known that polyamides can be prepared from various monomers. For example, U.S. Pat. No. 4,283,524 describes a process wherein polyamides are prepared from the ammonium salts of alpha, beta unsaturated moncarboxylic acids. U.S. Pat. No. 2,691,643 teaches that polyamides can be prepared by the thermal condensation of beta-amino propionic acid. U.S. Pat. Nos. 3,629,203 and 3,499,879 relate to the preparation of polyamides by the condensation reaction of acrylonitrile. U.S. Pat. No. 2,749,331 teaches that polyamides can be prepared from acrylamide. However, each of these processes is deficient in that the polyamide produced has very low molecular weight.

It is an object of this invention to provide a novel catalytic process to produce polyamides which have a high degree of polymerization. Moreover, by using a catalyst system in the reaction, the rate of the polymerization reaction is remarkably increased and the reaction period is greatly shortened.

SUMMARY OF THE INVENTION

It has now been discovered that a polyamide can be produced by polymerizing at least one of an alpha, beta-unsaturated carboxylic acid and ammonia, an ammonium salt of an alpha, beta unsaturated carboxylic acid, an alpha, beta unsaturated nitrile and water, beta-amino propionic acid or alkyl derivatives thereof and an alpha, beta unsaturated amide and ammonia in the the presence of a catalyst comprising a pentaammine cobalt (III) complex.

DETAILED DESCRIPTION

The Polymer

The polyamides obtained by the process of this invention contain a plurality of

amide groups as integral parts of the main polymer chain. In one embodiment, these polyamides are characterized as containing ethylene amido linkages in the polymer backbone. These ethylene amido linkages are generally defined as having repeating units as follows:

wherein each R is a suitable substituent which, in the simplest embodiment of the invention, would all be hydrogen. These ethylene amido linkages comprise the basic structure of a nylon-3 type polyamide.

These polyamides may also contain other carbonamide structural units. The carbonamide structural unit will vary depending on the particular monomer or monomers used in the polymerization. For example, the carbonamide unit may comprise a nylon-6 type unit which has the following formula:

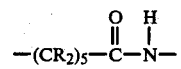

wherein each R is a suitable substituent which, in the simplest embodiment of the invention, would all be hydrogen. Other carbonamide units such as nylon-4 precursors, nylon-11 precursors, nylon-6, 6 precursors, nylon-6, 10 precursors, nylon-7 precursors, nylon-8 precursors and nylon-12 precursors may be contained in the polyamide of this invention. The properties of the resultant polyamide will depend on the type of monomer or monomers used and the ratio of the various monomers.

While this invention is directed principally to polyamides, it also includes within its ambit polyamides the polymer chains of which are formed from the above units together with other units which may be introduced into the chain, for example, by adding suitable copolymerizable monomers to the polymerization mixture.

The Process

In the instant process, polyamide forming systems are polymerized in the presence of a catalyst to produce a polyamide. A polyamide forming system is a compound or compounds which when present in sufficient quantity will react at polymerization conditions to produce a polyamide. Representative of polyamide forming systems which are known in the art and which are suitable for the instant invention are (1) an alpha, beta-unsaturated carboxylic and ammonia; (2) an ammonium salt of an alpha, beta-unsaturated carboxylic acid; (3) an alpha, beta unsaturated nitrile and water; (4) a beta-amino propionic acid or alkyl derivatives thereof and (5) an alpha, beta-unsaturated amide and ammonia. Examples of carboxylic acids which are within the scope of this invention include acrylic acid, methacrylic acid and crotonic acid. Examples of ammonium salts of alpha, beta-unsaturated carboxylic acids which are included within the scope of this invention are ammonium acrylate, ammonium methacrylate and ammonium crotonate. Examples of alpha, beta-unsaturated nitriles which are within the scope of this invention include acrylonitrile and methacrylonitrile. Examples of beta-amino propionic acid or alkyl derivatives thereof which are within the scope of this invention include beta-alanine and alpha-methyl-beta-alanine. Examples of alpha, beta unsaturated amides that are within the scope of this invention include acrylamide and methacrylamide. Each of these reactions is well known in the art.

This polymerization can be conducted under a broad range of process conditions which are generally known in the prior art. In the preferred practice of the invention, monomer or monomers are maintained at a temperature above their melting points but below the decomposition temperature of the products. It is generally preferred to conduct the process at a temperature between 100° and 300° C., and conducting the process between 135° and 200° C. is most preferred.

The temperature and amount of time required for polymerization are interrelated. At low temperatures it will take longer for a polymer to form than at high temperatures. In general, the reaction is conducted in less than 48 hours, with times ranging from 2 to 20 hours normally being adequate to produce the polyamide.

Although this polymerization can take place in an open container in contact with the atmosphere, it is preferred to carry out the polymerization in the absence of oxygen. This can be achieved by blanketing the reaction mixture with either an inert gas such as nitrogen or with a gaseous monomer, e.g. ammonia.

This reaction can proceed at atmospheric, superatmospheric or subatmospheric pressure. Normally, sufficient pressure is required to maintain the volatile ingredients in the liquid state under the polymerization conditions and to control the concentration of gaseous ingredients. Thus, the polymerization normally takes place under superatmospheric pressure. After the polymerization has proceeded for a suitable time, the pressure can be lowered to pull off water and other volatiles.

Another important factor in the conduct of the polymerization is the extent to which the reactants are able to physically contact each other so that the desired reaction can occur. Various solvents and liquid dispersions are helpful in improving the contacting. It has also been found that ammonia and/or water can be added to improve the conversion of the monomers to high molecular weight polymer.

This polymerization process can proceed by any of the generally known modes of polymerization including bulk, slurry, suspension or solution polymerization by batch, continuous or intermittant addition of the monomers and other components. The polyamides produced have a wide variety of applications. Generally, they may be used in any application calling for a nylon type polymer. For example, these polyamides can be used as fibers, plastics, films and molding resins.

The Catalyst

The catalyst useful in the inventive process comprises a pentaammine cobalt (III) complex.

This catalyst can be represented by the following formula:

$$[(NH_3)_5CoX]Y_n$$

wherein X and Y are suitable ligands and where n is 1, 2, 3, or 4. Ligands which can replace X in the above structure include carbanato, aquo acetato, thiocyanato, maleato, fluoro, chloro, bromo, iodo, pyridine, imidazoleo, dimethyl formamide, acetoxyaceto, cyclopropanecarboxylato, oxydiacetato, acetylene carboxylato, pyridine carboxylato, o-aminobenzoato and formato. Ligands which can replace Y in the above structure include $NO_3$, $ClO_4$ and $Cl$. These complexes and methods for preparing them are well known in the art.

The catalyst described above can be used in any amount which will catalyze the reaction. Preferably, catalyst concentrations between 0.01 to 5.0 mole percent, based on the amount of monomer in the reaction, can be used. It is especially preferred to use between 0.05 and 1.0 mole percent catalyst.

SPECIFIC EMBODIMENTS

In order to provide a better understanding of the present invention, the following working examples are presented.

Comparative Examples A

Ammonium methacrylate was added to a 25 ml closed glass ampoule. The ampoule was evacuated and repressurized three times and then sealed with a flame. The ampoule was then placed in an oven at 175° C. for 16 hours, cooled and opened carefully. The crude polymer obtained was dissolved in 20 ml of formic acid and then precipitated out in 800 ml of acetone. The precipitant was leached with 400 ml of boiling water to get rid of any catalyst residue. The polymer was identified by NMR spectroscopy. The results are shown in Table I.

EXAMPLES 1 thru 9

The procedure outlined in Comparative Example A was followed except that various molar amounts of catalyst (based on the moles of ammonium methacrylate) were added to the reaction system. The results are also shown in Table I.

TABLE I

| | Monomer: Ammonium Methacrylate | | | |
|---|---|---|---|---|
| | Temp.: 175° C. | | | Intrin. |
| | Time: 16 hours | | Cat | Viscosity |
| Exam | Catalyst | | Mole % | Product Composit. | (dl/g)(1) |

| Exam | Catalyst | Cat Mole % | Product Composit. | Intrin. Viscosity (dl/g)(1) |
|---|---|---|---|---|
| A | None | — | Polyamide | 0.11 |
| 1 | [(NH$_3$)$_5$CoCO$_3$]NO$_3$ | 0.1 | Polyamide | 0.46 |
| 2 | [(NH$_3$)$_5$CoH$_2$O](NO$_3$ | 0.5 | Polyamide | 0.49 |
| 3 | [(NH$_3$)$_5$CoH$_2$O](NO$_3$)$_3$ | 0.1 | Polyamide | 0.53 |
| 4 | [(NH$_3$)$_5$CoH$_2$O](NO$_3$)$_3$ | 0.5 | Polyamide | 0.52 |
| 5 | [(NH$_3$)$_5$Co—O—C(=O)—CH$_3$](NO$_3$)$_2$ | 0.1 | Polyamide | 0.58 |
| 6 | [(NH$_3$)$_5$Co—O—C(=O)—CH=CH](NO$_3$)$_2$ with CO$_2$H substituent | 0.1 | Polyamide | 0.68 |

TABLE I-continued

Monomer: Ammonium Methacrylate
Temp.: 175° C.
Time: 16 hours

| Exam | Catalyst | Cat Mole % | Product Composit. | Intrin. Viscosity (dl/g)(1) |
|---|---|---|---|---|
| 7 | [(NH$_3$)$_5$Co—O—$\overset{\overset{O}{\|}}{C}$—CH$_3$](NO$_3$)$_2$ | 0.5 | Polyamide | 0.42 |
| 8 | [(NH$_3$)$_5$CoF](ClO$_4$)$_2$ | 0.1 | Polyamide | 0.58 |
| 9 | [(NH$_3$)$_5$CoCO$_3$]Cl | 0.1 | Polyamide | 0.62 |

(1) Determined in 90 percent formic acid solution at 25° C.

COMPARATIVE EXAMPLE B

The experimental procedure in Comparative Example A was followed except that ammonium acrylate was used instead of ammonium methacrylate. The results are shown in Table II.

EXAMPLE 10

The procedure described in Comparative Example B was followed except that a catalyst was added. The results are also shown in Table II.

TABLE II

Monomer: Ammonium Acrylate
Temp.: 175° C.
Time: 16 hours

| Exam | Catalyst | Cat Mole % | Product Composit. | Intrin. Viscosity (dl/g) (1) |
|---|---|---|---|---|
| B | None | — | Polyamide | 0.15 |
| 10 | [(NH$_3$)$_5$CoCO$_3$]NO$_3$ | 0.1 | Polyamide | 0.31 |

COMPARATIVE EXAMPLE C

The procedure described in Comparative Example A was followed except that the reaction time was 24 hours and the reactants were acrylonitrile, methacrylonitrile and water. The polymer was dried in a vacuum oven at 60° C. for 16 hours and then water extracted overnight. The water insoluble polymer was dried in a vacuum oven overnight also.

EXAMPLE 11

The procedure described in Comparative Example C was followed except that a catalyst was added. The results are shown in Table III.

TABLE III

Monomer: Acrylonitile/Methacrylonitrile/Water
Temp.: 175° C.
Time: 16 hours

| Exam | Catalyst | Cat Mole % | Product Composit. | Conv. (%) | Water Insolubility (2) |
|---|---|---|---|---|---|
| C | None | — | Copolyamide | 0 | 0 |
| 11 | [(NH$_3$)$_5$CoCO$_3$]NO$_3$ | 1 | Copolyamide | 52 | 8.0 |

(1) Conversion = $\frac{\text{Reactants (gms) Converted to Products}}{\text{Total Reactants (gms)}}$ (2) Water Insolubility = $\frac{\text{Insoluble Polyamide (gms)}}{\text{Total Polyamide (gms)}}$

EXAMPLES 12 AND 13

The procedure described in Comparative Example A was followed except that the monomers comprise ammonium methacrylate and caprolactam. The results are shown in Table IV.

TABLE IV

Monomer: Ammonium Acrylate
Temp.: 175° C.
Time: 16 hours

| Exam | Catalyst | Cat Mole % | Product Composit. | Intrin. Viscosity (dl/g) (1) |
|---|---|---|---|---|
| 12 | [(NH$_3$)$_5$CoCO$_3$]NO$_3$ | 1.0 | Copolyamide | 0.32 |
| 13 | [(NH$_3$)$_5$CoCO$_3$]NO$_3$ | 0.1 | Copolyamide | 0.77 |

(1) Determined in 90 percent formic acid at 25° C.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

We claim:

1. A process for preparing a polyamide containing a plurality of $$\underset{\underset{C}{\|}}{\overset{O}{\|}}\underset{N}{\overset{H}{|}}$$
$$-C-N-$$

amide groups as integral parts of the main polymer chain comprising polymerizing a polyamide forming system, chosen from (1) an alpha, beta-unsaturated carboxylic acid and ammonia, (2) an ammonium salt of an alpha, beta unsaturated carboxylic acid, (3) an alpha, beta-unsaturated nitrile and water, (4) an alpha, beta-unsaturated amide and ammonia, (5) or a beta-amino propionic acid or its alkyl derivatives, in contact with a catalyst comprising a pentaamine cobalt (III) complex.

2. The process of claim 1 wherein the catalyst has the following formula:

[(NH$_3$)$_5$CoX]Y$_n$ wherein X and Y are ligands and n is 1, 2, 3 or 4.

3. The process of claim 2 wherein X is selected from the group consisting of:

—CO$_3$, $$-O-\overset{\overset{O}{\|}}{C}-CH_3,$$

$$-O-\overset{\overset{O}{\|}}{C}-CH=\overset{}{\underset{CO_2H}{C}}H, \text{ and}$$

—F.

4. The process of claim 2 wherein Y is selected from the group consisting of —NO₃ and —Cl.

5. The process of claim 1 wherein an alpha, beta-unsaturated carboxylic acid and ammonia is polymerized.

6. The process of claim 1 wherein the polyamide forming system is an ammonium salt of an alpha, beta-unsaturated carboxylic acid.

7. The process of claim 1 wherein the polyamide contains ethylene amido linkages of the following structure:

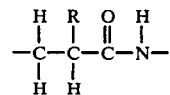

wherein R is an alkyl group.

8. The process of claim 7 wherein R is methyl.

* * * * *